United States Patent [19]

Bernal et al.

[11] 3,781,905

[45] Dec. 25, 1973

[54] OPTICAL MASS MEMORY

[75] Inventors: Enrique Bernal G.; Di Chen, both of Minetonka, Minn.

[73] Assignee: Honeywell Inc., Minneapolis, Minn.

[22] Filed: Sept. 22, 1972

[21] Appl. No.: 291,448

[52] U.S. Cl. .. 346/74 MT, 340/174.1 M, 346/76 L, 350/151

[51] Int. Cl. .................................... G11b 5/02

[58] Field of Search ..................... 346/76 L, 74 MT; 340/174.1 M; 350/160, 151

[56] References Cited

UNITED STATES PATENTS 3,164,816 1/1965 Chang ........................ 340/174.1 M
3,368,209 2/1968 McGlauchlin ............... 340/174.1 M
3,539,383 8/1972 Chen ........................ 340/174.1 M
3,715,740 2/1973 Schmit ...................... 340/174.1 M

*Primary Examiner*—Terrell W. Fears
*Attorney*—Lamont B. Koontz et al.

[57] ABSTRACT

An optical mass memory of the Curie point writing type which utilizes a pulsed laser to write on low temperature phase manganese bismuth film. The duration of the laser pulses is less than 10 nanoseconds. Greatly reduced readout signal level variation due to crystallographic phase change is achieved.

11 Claims, 7 Drawing Figures

OPTICAL MASS MEMORY

BACKGROUND OF THE INVENTION

The present invention relates to a system for storing information. More particularly, the present invention relates to an improved optical mass memory of the Curie point writing type having a memory medium of low temperature phase manganese bismuth film. As used in this specification, "MnBi film" includes ferromagnetic films containing MnBi compound which have been doped or modified by other elements such as nickel, titanium, and antimony.

The continuing need for increased data storage capacity in modern information systems has required the development of new technologies for mass data storage. Laser accessed optical memories offer a significant increase in bit packing density, and hence capacity, over conventional magnetic recording techniques.

One highly advantageous optical information storage scheme utilizes a laser to provide Curie point writing. Such a system was disclosed and claimed in U.S. Pat. No. 3,368,209 to L. D. McGlauchlin et al., which is assigned to the same assignee as the present invention. Although many ferromagnetic films may be used as a memory medium for a Curie point type optical mass memory, thin films of manganese bismuth (MnBi) have been found to be a most attractive memory medium. MnBi films exhibit an unusually large magneto-optic rotation and a preferred magnetization direction which is oriented normal to the plane of the film. Reproducible, large area thin films of MnBi having substantially uniform magnetic properties over the entire area of the film may be formed by the process described by D. Chen et al. in U.S. Pat. No. 3,539,383, which is assigned to the same assignee as this application.

While manganese bismuth film has many advantages as a thermomagnetic memory medium, it does have some disadvantages. In particular, it has been discovered that the thermal cycling required to write and erase information by the Curie point method on MnBi film causes a gradual shift of the readout signal levels. This shift in signal levels could cause a reduction in the margin for detection.

The shift in signal levels in MnBi film is the result of a crystallographic phase change. The intermetallic compound MnBi possesses two crystallographic phases. At temperatures below 360°C, MnBi is ferromagnetic with a nickel arsenide type hexagonal crystal structure. Above 360°C, a first order phase transition takes place and the compound becomes paramagnetic with a high temperature crystallographic structure. Upon quenching back to room temperature, the high temperature structure can be frozen in. The resultant compound is again ferromagnetic but with a reduced Curie temperature of about 180°C. This "quenched high temperature" phase MnBi exhibits a magneto-optic rotation which is less than the magneto-optic rotation of "normal" or "low temperature" phase MnBi.

Curie point writing on normal phase MnBi films requires heating of a spot to a temperature above 360°C, the normal phase Curie temperature. The magnetization vector on the heated spot after cooling is determined by the combined influence of the demagnetizing field from the surrounding unheated regions and any external applied magnetic field. As described by D. Chen and R. L. Aagard in "MnBi Films: High-Temperature Phase Properties and Curie-Point Writing Characteristics," *Journal of Applied Physics*, 41, 2530 (1970), a one micron diameter spot on MnBi film of 500 A thickness can be heated from room temperature to 360°C in a microsecond. Upon termination of the laser power, the heated spot cools back to room temperature within a few microseconds. The rapid cooling process is similar to quenching the written spot. As a result, the thermal cycling required to write and erase information by the Curie point method on MnBi film causes a gradual transformation from one crystallographic phase to the other phase. As a written spot gradually transforms from one crystallographic phase to another with repeated thermal cycling, the magnitude of the magneto-optic effect exhibited by the spot gradually changes, thereby causing a change in the readout signal level.

SUMMARY OF THE INVENTION

The optical mass memory of the present invention utilizes Curie point writing on a memory medium of low temperature phase MnBi film. The readout signal level variation due to crystallographic phase changes in MnBi film is greatly reduced or substantially eliminated.

Light source means produces light pulses having an intensity sufficient to heat a region of the MnBi film above the low temperature phase Curie point. The pulses have a duration of less than 10 nanoseconds. Light pulse directing means directs the light beam to predetermined regions of the MnBi film.

DETAILED DESCRIPTION OF THE PREFERRED EMBODIMENTS

Basis of the Invention

Figure 1:
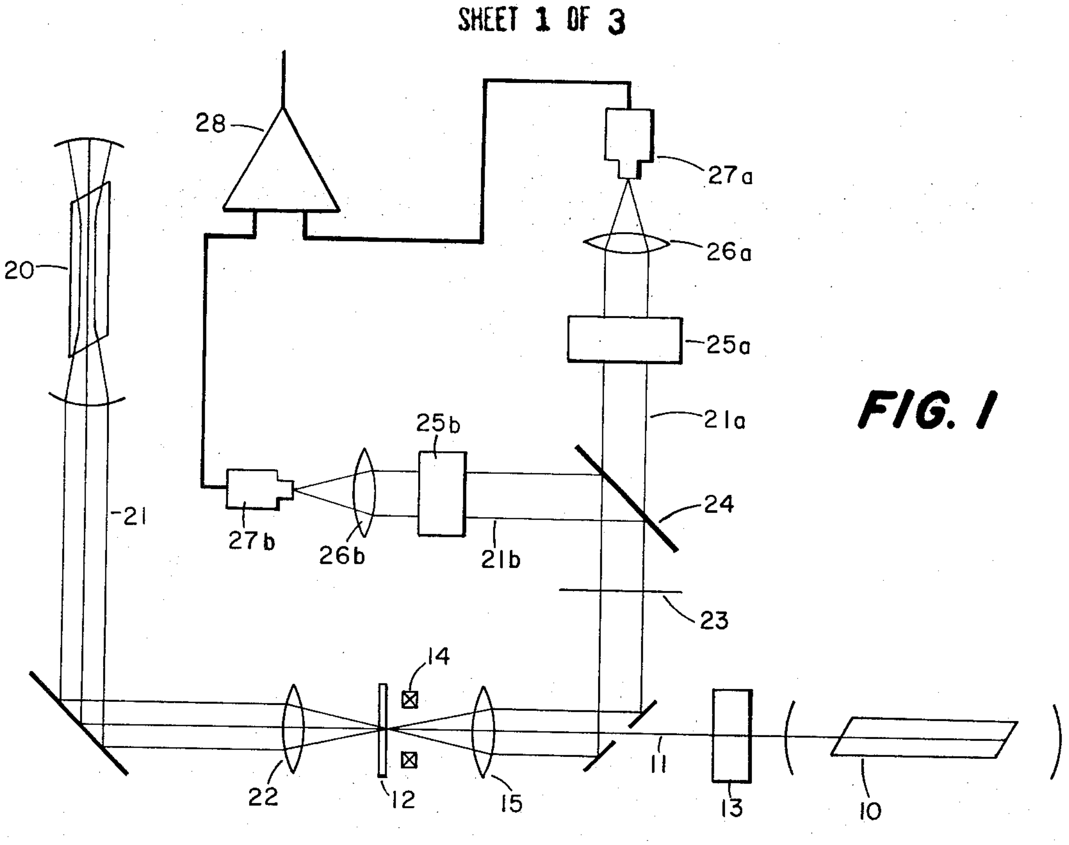
FIG. 1 is a diagrammatical illustration or experimental apparatus for dynamic monitoring of Curie point writing on normal phase MnBi film.

The optical mass memory of the present invention greatly extends the number of times that a normal phase MnBi film can be cycled above the normal phase Curie temperature without experiencing a fractional change of crystallographic phase large enough to affect its performance as a memory medium. In other words, readout signal level variation due to crystallographic phase change is greatly reduced with the present invention. This improvement is achieved by the use of laser pulses having a duration of less than 10 nanoseconds. The use of laser pulses of this duration for Curie point writing either eliminates the crystallographic phase transition entirely or minimizes the amount of crystallographic phase transition per write cycle.

The present invention is based upon several experimentally observed characteristics of Curie point writing on normal phase MnBi films. First, the crystallographic phase change in MnBi films involves atomic movement and is strongly dependent on the integrated or cumulative time above 360°C and the peak temperature to which the film is heated. Second, the magnetic switching involved in Curie point writing on normal phase MnBi films involves only electronic spin orientation and not a crystallographic phase change. Magnetic switching may, therefore, occur even in the absence of a crystallographic phase change. Third, the characteristic time for electronic spin orientation is much faster than atomic movement and, therefore, magnetic switching requires much less time above 360°C than does the crystallographic phase change. Fourth, the time above 360°C for one write cycle is dependent upon both the time duration of the heating pulse and the thermodynamic properties of the MnBi film and the substrate. The time above 360°C for one write cycle is minimized by the use of laser pulses of less than 10 nanoseconds duration.

Crystallographic Phase Change Involves Atomic Movement

In the low temperature phase MnBi unit cells, there are two vacant interstitial sites located at (one-third, two-thirds, three-fourths) and (two-thirds, one-third, one-fourth). A. F. Andresen et al. in "The Magnetic and Crystallographic Properties of MnBi Studied by Neutron Diffraction" in *Acta Chemica Scandinavica*, 21, 1543 (1967), suggested that 15 per cent of the manganese atoms occupy these interstitial sites in the quenched high temperature phase. D. Chen, R. L. Aagard, and T. S. Liu in "Magneto-Optic Properties of Quenched Thin Films of MnBi and Optical Memory Experiments," *Journal of Applied Physics*, 41, 2530 (1970), suggested that in quenched phase MnBi films 15 per cent of the interstitial sites were occupied by manganese atoms through a diffusion process. In such a diffusion or nucleation and growth process, manganese atoms oscillate and move about their lattice sites when MnBi is raised to a temperature above 360°C and try to tunnel to the interstitial positions in the nickel arsenide structure. When MnBi is then rapidly cooled, the interstitial manganese atoms are frozen in. This explanation indicates that the phase transformation is a random process and that the amount of transformation is dependent upon the peak temperature to which the MnBi was heated and the cumulative time above 360°C.

Although it has not been conclusively determined that the crystallographic phase change in MnBi is a diffusion process, experimental results indicate that the phase transformation does involve atomic movement. Repetitive cycling of manganese bismuth film to temperatures over 360°C has verified that the phase transformation is strongly dependent upon both the peak temperature and the cumulative time above 360°C. In addition, electron microscope and x-ray diffraction studies indicate that the crystallographic structure of quenched phase MnBi is slightly different from that of normal phase MnBi.

Curie Point Writing on MnBi Involves Elecronic Spin Orientation

The Curie temperature of normal phase MnBi film is often stated to be 360°C. This is the temperature at which the magnetization of the MnBi film is zero. It has been suggested by some investigators, however, that 360°C is not the "true Curie temperature" of normal phase MnBi. These investigators suggest that normal phase MnBi loses its magnetization at 360°C because the crystallographic phase transition occurs at that temperature. Since the Curie temperature of high temperature phase MnBi is approximately 180°C, the magnetization of the film goes to zero at 360°C because the film transforms to the high temperature phase which is non-magnetic at such high temperatures. The abrupt loss of magnetization in MnBi near 360°C is better described by a first order transition (indicative of a crystallographic phase change) rather than a second order transition (as predicted by the Curie-Weiss law).

The present invention is successful in minimizing the crsytallographic phase change because the loss of magnetization at 360°C is not dependent upon the crystallographic phase change. Thus, heating a spot very rapidly to minimize any phase transition does not preclude magnetic switching of the spot.

FIG. 1 shows the experimental apparatus used to demonstrate that magnetic switching in MnBi films can occur without any appreciable crystallographic phase transition. Argon laser 10 operating at 5145 A wavelength and at a delivered power of about 200 milliwatts was used to write spots of approximately nine micron diameter on MnBi thin film 12. Modulator 13, which controlled the intensity of light beam 11 from argon laser 10, provided a laser pulse having a fast exponential rise and a slow exponential decay. Coil 14 was capable of providing an external magnetic field to enhance the closure flux during writing. Lens 15 focused light beam 11 to a focused light spot at MnBi film 12.

Helium neon laser 20 of less than one milliwatt power level produced light beam 21 having a wavelength of 6328 A. Light beam 21 was focused to a 2 micron spot size by lens 22. Light beam 21 was used to probe the spot being written by light beam 11. The magneto-optic Faraday effect of MnBi film 12 modified the polarization direction of the probing beam 21, which was analyzed and detected by a differential detection system. 6328 A band-pass filter 23 insured that only probing beam 21 was received by the differential detection system. Beam splitter 24 split probing beam 21 into first and second beams **21*a* and 21*b*. First and second polarizers 25*a* 25*b* analyze beams 21*a* and 21*b*, which are then focused by lenses 26*a* and 26*b* respectively. Detectors 27*a* and 27*b* produce an output signal indicative of the intensity of the light received. The signals from the two detectors were fed into a differential amplifier 28. A Tektronix 1A7A differential amplifier with a common mode rejection bandwidth of 1 MHz and a bandpass of more than 1 MHz was used for the experimental study. The signal from the differential amplifier 28 as well as an output signal from argon laser 10** was fed into a dual beam oscilloscope.

Figure 2:
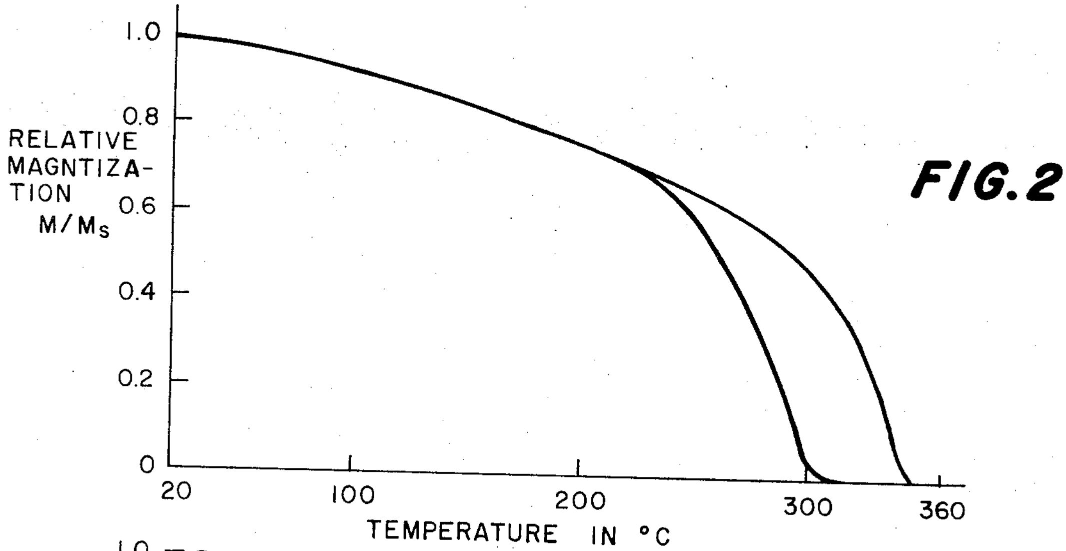
FIG. 2 is a quasi-static magnetization curve of normal phase MnBi film upon heating to and cooling from the normal phase Curie temperature.

FIG. 2 shows a quasi-static magnetization curve of normal phase MnBi film when heated to and cooled from the Curie temperature. In other words, the temperature of the film was raised by increments during a time span of several minutes. The quasi-static magnetization curve shows an open thermal hysteresis, which indicates that a crystallographic phase transition occurred. To determine whether a crystallographic phase change occurs during Curie point writing, the apparatus of FIG. 1 was used. Microsecond heating pulses from argon laser 10 heated the spot to above the Curie temperature while the magneto-optic effect from the spot was monitored. These experiments showed that when microsecond heating pulses were used, no noticeable thermal hysteresis occurred. In other words, the magnetization recovered along the heating curve without going through a phase transition. This indicates that electronic spin orientation rather than the crystallographic phase transition caused the magnetic switching.

Minimizing the Time Above 360°C

The characteristic time for spin orientation is much faster than that for atomic movement. Ferromagnetic resonance studies have indicated that the spin reorientation in MnBi film can occur in times shorter than one nanosecond. See D. Chen and Y. Gondo, "Temperature Dependence of the Magneto-optic Effect and Resonance Phenomena in Oriented MnBi Films," *Journal of Applied Physics*, 35, 1024 (1964). The object of the present invention is to make the time above 360°C for one write cycle insufficient to cause any atomic movement while it is still sufficient to allow magnetic switching to occur. Even if the time above 360°C for one cycle in the present invention does cause some atomic movement and thus some crystallographic phase change, the fractional amount of crystallographic phase change per cycle is so small that the MnBi film can be cycled above 360°C a large number of times without experiencing a fractional change of phase large enough to affect the performance of the MnBi film as a memory medium.

The time above 360°C is dependent not only upon the time duration of the laser pulse, but also upon the cooling time of the MnBi film. The cooling time is determined by the thermodynamic properties of the MnBi film and the substrate. The results of the two beam experiment described above indicates that the minimum time above 360°C is achieved when laser pulses of less than 10 nanoseconds are used for Curie point writing.

Figure 3:
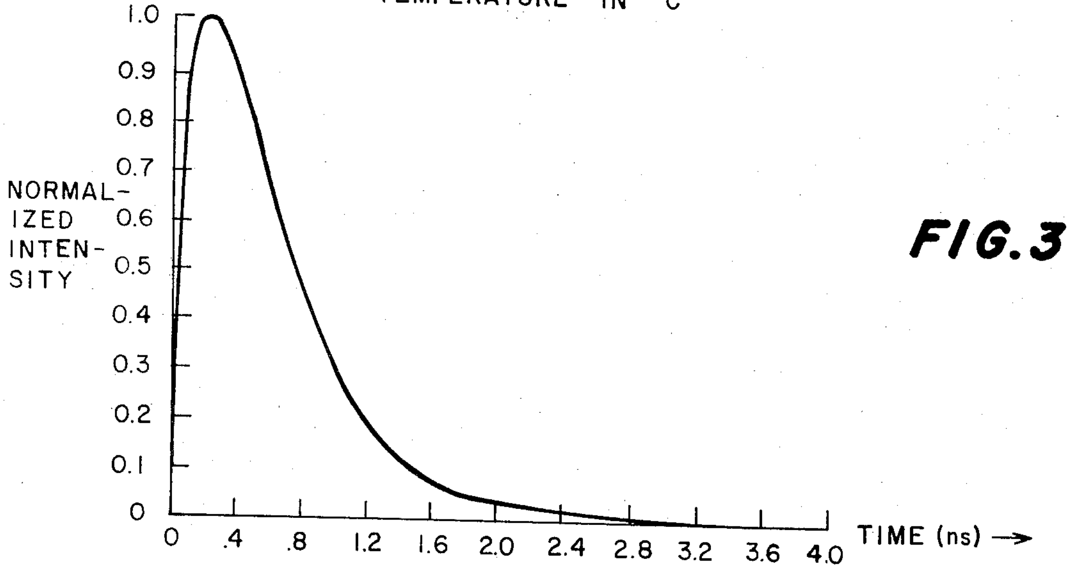
FIG. 3 is a normalized graph of the time dependence of a laser pulse of 0.75 nanoseconds duration.

FIG. 3 shows the time dependence of a laser pulse having a duration of about 0.75 nanoseconds. The time duration is the time interval between the half-power points of the laser pulse. The laser pulse has a gaussian spatial dependence with circular symmetry and a double exponential time dependence. Mathematically, the pulse has the form $$I(r, t) = \frac{2P_0}{\pi r_0^2 \sin^2\left(\frac{\pi V_0}{2V_{\lambda/2}}\right)} \exp\left(-\frac{2r^2}{r_0^2}\right) \sin^2\left[\frac{\pi V(t)}{2V_{\lambda/2}}\right]$$

where $$V(t) = \frac{V_0 \beta^{\frac{\beta}{\beta-1}}}{(1-\beta)} [e^{-t/\tau_2} - e^{-t/\tau_1}]$$

$P_o$ = peak power measured at film
$r_o$ = gaussian beam radius
$V_o$ = peak voltage applied to modulator
$V$ = half-wave retardation voltage of modulator
$\beta = \tau_1/\tau_2$ It can be seen that the time dependent of the laser pulse has two time constants, $\tau 1$ and $\tau 2$, $\tau 1$ determines the rise time of the pulse, and $\tau 2$ determines the fall time.

Figure 4:
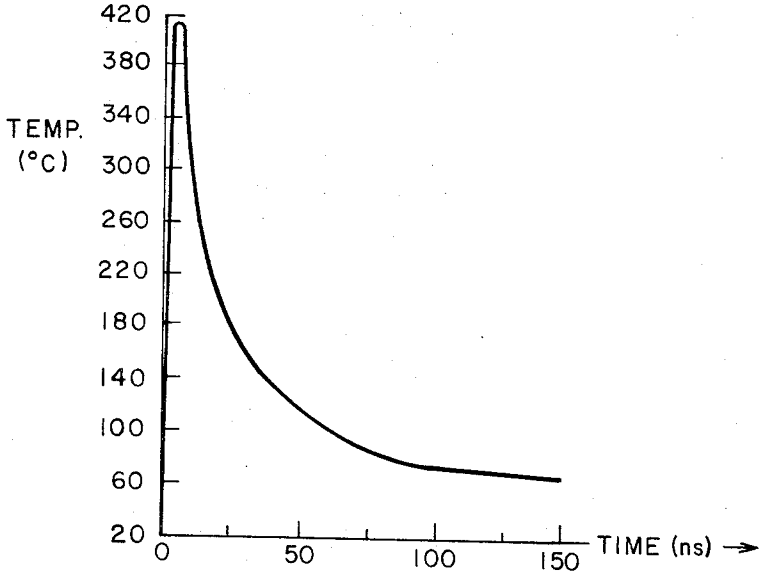
FIG. 4 is a graph of the calculated time dependence of temperature rise at the center of a 1 micron diameter spot on a MnBi film of 600 A thickness when a 0.75 nanosecond laser pulse as shown in FIG. 3 is used for Curie point writing.

The temperature at the center of a one micron diameter spot written on a 600 A thick film of MnBi which is deposited on a glass substrate when heated by the laser pulse of FIG. 3 is shown in FIG. 4. In general, the temperature at the center of a spot on MnBi during Curie point writing may be calculated by the following equation.

$$T(r, t) = \frac{2P\alpha hk}{\pi 3/2\sqrt{k-1}\,\rho_1 C_1} \int_0^t P(t-t')F(r, t')dt'$$

where $$F(r, t') = \int_1^k \left\{ \frac{\exp\left\{\frac{\alpha Kt}{k-1}[hk(y-1)+\alpha(k-y)] \frac{2r^2}{8Kty+r_0^2}\right\}}{8Kty+r_0^2} \times \left\{ \sqrt{\frac{Kt}{k-y}}[e^{-u_2^2/a} - e^{-u_1^2/a}] - \alpha Kt\sqrt{\frac{\pi}{k-1}}\left[\operatorname{erf}\left(\frac{u_2}{\sqrt{a}}\right) - \operatorname{erf}\left(\frac{u_1}{\sqrt{a}}\right)\right]\right\}\right\} y\,dy$$

and $u_1 = Kt\,[hk(y-1)+2\alpha(k-y)]$
$u_2 = u_1 + (k-1)d$
$\alpha$ = optical absorption coefficient
$K, K_1$ = diffusivity of substrate and MnBi respectively
$k = (K_1/K)$
$K, K_1$ = thermal conductivities
$d$ = MnBi thickness
$\rho_1$ = density of MnBi
$C_1$ = heat capacity of MnBi
$h = (K/K_1 d)$ A solution to this equation indicates that the minimum cooling time of a MnBi film on a glass substrate is on the order of a few nanoseconds. A substrate with much higher thermal conductivity than that of glass will reduce the cooling time somewhat. It is found, however, that it is the thermal properties of the MnBi film and the substrate, and not the time duration of the laser pulse, which determines the minimum time above 360°C which can be achieved.

PREFERRED EMBODIMENTS

Figure 5:
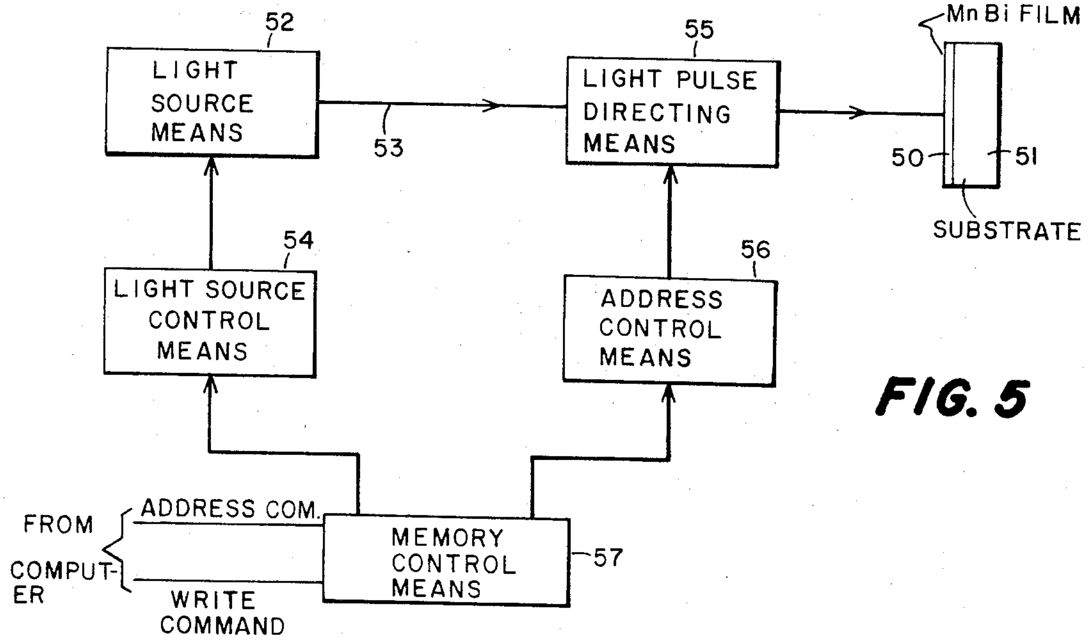
FIG. 5 is a diagrammatical illustration of a preferred embodiment of the present invention.

FIG. 5 shows a preferred embodiment of the optical mass memory of the present invention. A bit-by-bit optical mass memory of the Curie point writing type has as its memory medium a low temperature phase MnBi film 50, which is deposited on substrate 51. Light source means 52 produces a light beam 53 consisting of light pulses having a duration of less than 10 nanoseconds. Each pulse has an intensity sufficient to heat a region of MnBi film 50 above the low temperature phase Curie point (360°C). The production of light pulses by light source means 52 is controlled by light source control means 54. Light pulse directing means 55 directs a light pulse to a predetermined region of the MnBi film 50 in response to an address control signal from address control means 56. Memory control means 57 coordinates the operation of light source control means 54 and address control means 56. Memory control means 57 receives address and write commands from the central processor of an electronic computer.

A bit-by-bit optical memory should have a data rate of greater than 1 MHz and preferably 10 MHz to be commercially feasible. Thus light source means 52 must be capable of producing light pulses of less than 10 nanosecond duration at a rate of at least $10^6$ pulses per second. The preferred light source means is capable of producing pulses at a rate of at least $10^7$ pulses per second.

One laser capable of meeting these stringent requirements is the cavity dump laser described by D. Maydan in "Fast Modulator For Extraction of Internal Laser Power," *Journal of Applied Physics*, 41, 1552 (1970). The cavity dump laser has the advantage that the production of each pulse is individually controlled. Thus the time between individual pulses may be varied if required.

Another laser capable of producing extremely short duration laser pulses at a high repetition rate is the mode-locked laser. This laser was described by P. W. Smith in "Mode-Locking of Lasers," *IEEE Proceedings*, 58, 1342 (1970). The mode-locked laser produces a continuous train of pulses. A preferred embodiment of the present invention utilizing a mode-locked laser is described with reference to FIG. 6.

In a preferred embodiment of the present invention, the light pulses utilized for Curie point writing have a duration of between about one-tenth nanosecond and about 10 nanoseconds. The use of light pulses having a duration less than about one-tenth nanosecond has little effect on the time above 360°C since the minimum cooling time of the film, as determined by the thermodynamic properties of the film and substrate, is on the order of a few nanoseconds. Since the power of individual laser pulses becomes increasingly difficult to control as the pulse duration is reduced, the light pulses of the present invention have a preferred duration of between about one-tenth nanosecond and about 10 nanoseconds.

Figure 6:
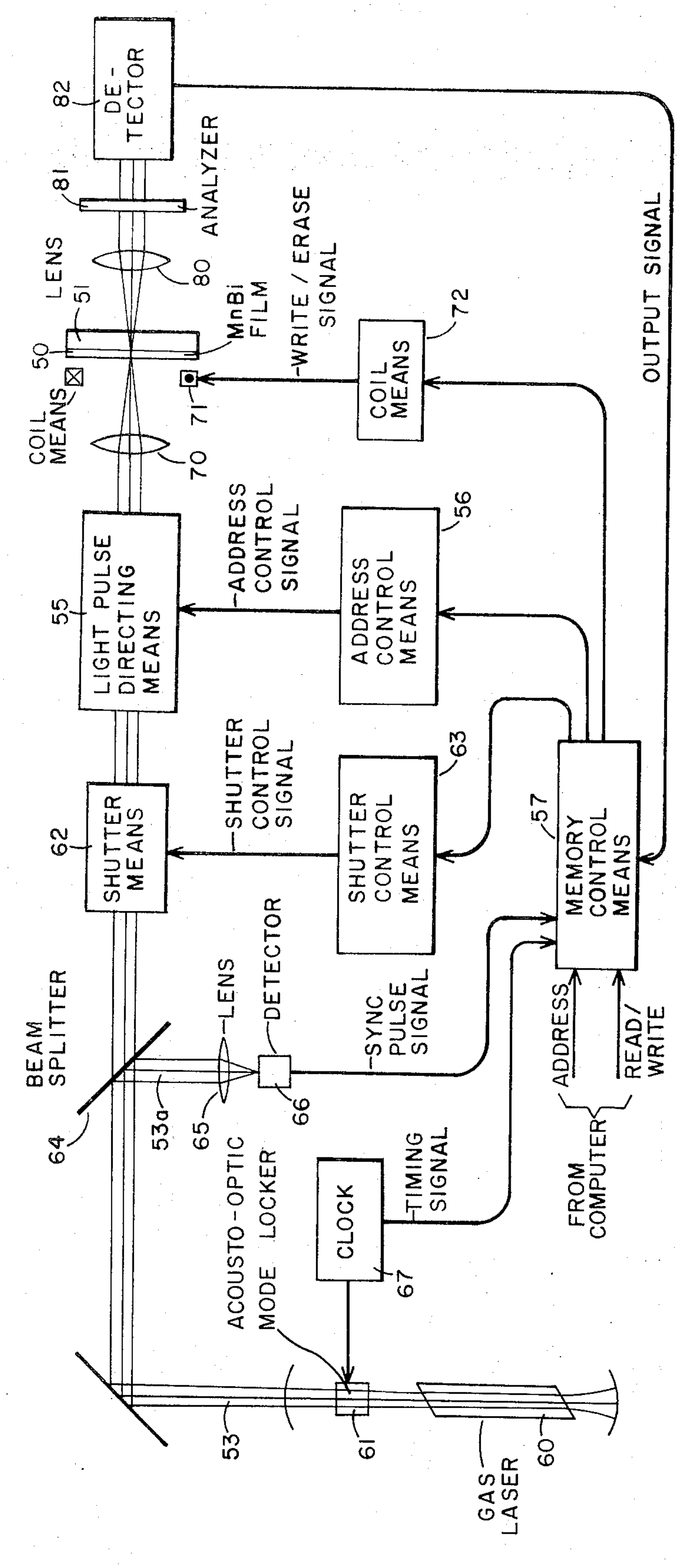
FIG. 6 is a diagrammatical illustration of a preferred embodiment using a mode-locked laser.

In FIG. 6 is shown an embodiment of the present invention which is similar to the embodiment shown in FIG. 5. Similar numerals have been used to designate similar elements. The light source means for the embodiment shown in FIG. 6 is a mode-locked laser comprising a gas laser 60 and an acousto-optic mode-locker 61 which is positioned in the gas laser cavity. The light source control means comprises shutter means 62 and shutter control means 63. The optical mass memory also includes beam splitter 64, lens 65, detector 66, clock 67, focusing means 70, coil means 71, and coil driver 72. Magneto-optic readout of information is achieved by a detection system comprising lens 80, analyzer 81, and detector 82.

Figure 7:
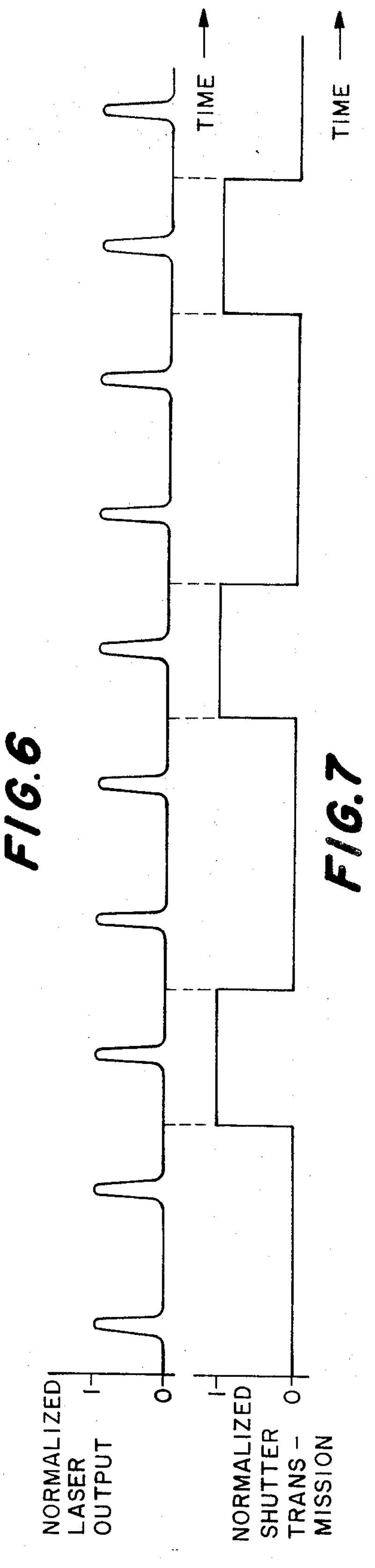
FIG. 7 is a normalized graph of the laser output and shutter transmission as a function of time.

The continuous train of pulses produced by the mode-locked laser contains far more light pulses than are actually needed. For example, the mode-locked laser may produce $10^8$ pulses per second whereas the memory data rate is about $10^7$ bits per second. In such an example, only one of every ten pulses produced is used for Curie point writing. Shutter means 62, which is controlled by shutter control means 63, allows selected individual pulses to impinge upon MnBi film 50. As shown in FIG. 7, shutter means 62 acts as a gate to select desired pulses from the continuous train of pulses. Shutter control means 63 provides a shutter control signal to shutter means 62 which causes shutter means 62 to provide a transmission window during the time that a desired pulse is produced. The timing and synchronization of shutter control means 63 is provided by clock 67 and by a pulse monitoring means. Clock 67 provides a timing signal to acousto-optic mode-locker 61 and to memory control means 57. The pulse monitoring means, which comprises beam splitter 64, lens 65, and detector 66, monitors the continuous train of pulses produced by the mode-locked laser and produces a synchronizing pulse signal indicative of each pulse of the continuous train. In particular, beam splitter 64 splits off a small portion 53*a* of light beam 53. Detector 66 receives light beam 53*a* and produces the synchronizing pulse signal. Memory control means 57 uses the timing signal and the synchronizing pulse signal to determine the precise instant that shutter means 62 should provide a transmission window for the desired pulse.

Light pulse directing means 55 directs light beam 53 to predetermined regions of MnBi film 50. Light pulse directing means 55 may comprise electro-optic, acousto-optic, or mechanical light beam deflectors, or may comprise a mechanical system for positioning light beam 53 and MnBi film with respect to one another.

Focusing means 70 focuses light beam 53 to a focused light spot at MnBi film 50. Although focusing means 70 is shown as a signal lens, it is to be understood that a system of lenses may comprise focusing means 70.

Coil means 71 applies an external magnetic field normal to the plane of MnBi film 50. When a particular spot is heated above the normal phase Curie point, and then cooled through the Curie point, the spot becomes magnetized in either a direction parallel or anti-parallel to the magnetization direction of the surrounding film. The orientation of the magnetization of the spot is dependent upon the existing net magnetic field. The closure flux (or demagnetizing field) of the surrounding film is sufficient to align the magnetic vector of the spot in a direction anti-parallel to the magnetization direction of the surrounding area. The closure flux of the surrounding area can be aided, however, by an externally applied magnetic field provided by coil means 71. In addition, coil means 71 supplies an external magnetic field during erasure which is sufficient to overcome the closure flux of the surrounding film area and align the magnetic vector of the spot in a direction parallel to the magnetization direction of the surrounding area. Coil means 71 is actuated by a write or erase signal from coil driver 72. For a more detailed description of Curie point writing and erasing, see D. Chen, J. F. Ready, and E. Bernal G., "MnBi Thin Films: Physical Properties and Memory Applications," *Journal of Applied Physics*, 39, 3916 (1968), and E. Bernal G., "Mechanism of Curie-Point Writing in Thin Films of Manganese Bismuth," *Journal of Applied Physics*, 42, 3877 (1971).

Readout of information stored on MnBi film 50 is achieved by a magneto-optic effect. The magneto-optic rotation of the polarization of light beam 53 after transmission through or reflection from a spot on MnBi film 50 will depend upon the orientation of the magnetic vector of the spot. In FIG. 6 the magneto-optic Faraday effect is used for readout. It is to be understood, however, that the magneto-optic Kerr effect, which uses light reflected from the MnBi film 50, may also be used.

During readout a light beam is directed to predetermined regions on MnBi film 50. The readout light beam may be light beam 53, which is produced by light source means 52, with the mode-locker turned off or may be a separate read-out light beam. In either case, the readout light beam has an intensity insufficient to heat the MnBi film above the normal phase Curie point. If light beam 53 is used for readout, the intensity of the beam must be attenuated. The attenuation may be performed by shutter means 62, or by a separate modulator. Lens 80 receives the readout light beam from MnBi film 50 and focuses the readout light beam on detector 82. Analyzer 81 is oriented to block radiation having a particular polarization direction. The orientation of analyzer 81 is such that the intensity of the readout light beam reaching detector 82 differs depending upon the magnetization direction of the spot being read out. Detector 82 produces an output signal indicative of the intensity of the readout light beam received.

For magneto-optic readout, a laser operating at a wavelength of greater than about 6,000 A is preferred since the magneto-optic figure of merit is wavelength dependent. See D. Chen, R. L. Aagard, and T. S. Liu, "Magneto-Optic Properties of Quenched Thin Films of MnBi and Optical Memory Experiments," *Journal of Applied Physics*, 41, 1395 (1970). In particular, a helium neon laser operating at 6328 A is a preferred laser source for magneto-optic readout.

In one successful embodiment of the present invention, a mode-locked Coherent Radiation Model 52 argon laser produced a pulse train of laser pulses having a duration of 0.25 nano-seconds at the half power points. A Coherent Radiation Model 464 acousto-optic mode-locker was positioned in the laser cavity. An electro-optic modulator provided a transmission window of about 10 nanoseconds to select individual pulses from the argon laser. A peak power of about 600 milliwatts was required to write a spot of about 1 micron in diameter on a MnBi film.

While this invention has been particularly shown and described with reference to preferred embodiments, it will be understood by those skilled in the art that changes in form and detail may be made without departing from the spirit and scope of the invention.

The embodiments of the invention in which an exclusive property or right is claimed are defined as follows:

1. A bit-by-bit optical mass memory of the Curie point writing type having a memory medium of low temperature phase MnBi film and being characterized by greatly reduced readout signal level variation due to crystallographic phase changes, the optical mass memory comprising:

light source means for producing light pulses having an intensity sufficient to heat a region of the MnBi film above the low temperature phase Curie point, the light pulses each having a duration of less than 10 nanoseconds; and light pulse directing means for directing a light pulse to a predetermined region of the MnBi film.

2. The optical mass memory of claim 1 and further comprising:

light source control means for controlling the production of light pulses by the light source means;

address control means for controlling the light pulse directing means; and memory control means for coordinating the operation of light source control means and address control means.

3. The optical mass memory of claim 2 wherein the light source means produces a continuous train of light pulses, and wherein the light source control means comprises:

shutter means for allowing selected individual light pulses of the continuous train to impinge upon the MnBi film in response to a shutter control signal; and shutter control means for producing the shutter control signal.

4. The optical mass memory of claim 3 further comprising pulse monitoring means for monitoring the continuous train of light pulses and for providing a synchronizing pulse signal to the memory control means, the synchronizing pulse signal being indicative of each pulse of the continuous train.

5. The optical mass memory of claim 4 wherein the light source means is a mode-locked laser.

6. The optical mass memory of claim 5 wherein the mode-locked laser comprises:

a gas laser having a laser cavity; and an acousto-optic mode-locker positioned in the laser cavity.

7. The optical mass memory of claim 6 and further comprising clock means for providing a timing signal to the memory control means and the acousto-optic mode-locker.

8. The optical mass memory of claim 4 wherein the pulse monitoring means comprises:

beam splitter means positioned between the light source means and the shutter means for splitting off a portion of the continuous train of light pulses; and detector means for receiving the portion of the continuous train and for producing a synchronizing pulse signal indicative of each pulse of the continuous train.

9. The optical mass memory of claim 1 wherein the light source is a cavity dump laser.

10. The optical mass memory of claim 1 wherein the light source means produces the light pulses at a rate of greater than $10^6$ pulses per second.

11. The optical mass memory of claim 1 wherein the pulses have a duration of greater than about one-tenth nano-second.

* * * * *